(12) United States Patent
Salam et al.

(10) Patent No.: US 8,588,081 B2
(45) Date of Patent: Nov. 19, 2013

(54) MONITORING A FLOW SET TO DETECT FAULTS

(75) Inventors: Samer Salam, Vancouver (CA); Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 400 days.

(21) Appl. No.: 12/835,777

(22) Filed: Jul. 14, 2010

(65) Prior Publication Data

US 2012/0014261 A1 Jan. 19, 2012

(51) Int. Cl.
*H04L 1/00* (2006.01)
*H04L 12/26* (2006.01)

(52) U.S. Cl.
USPC .......................... 370/242; 370/248; 370/249

(58) Field of Classification Search
USPC .......................... 370/242, 248, 249
See application file for complete search history.

(56) References Cited

U.S. PATENT DOCUMENTS

| | | | |
|---|---|---|---|
| 6,654,343 B1* | 11/2003 | Brandis et al. | 370/229 |
| 6,915,445 B2 | 7/2005 | Navar et al. | |
| 7,046,665 B1 | 5/2006 | Walrand et al. | |
| 7,447,147 B2 | 11/2008 | Nguyen et al. | |
| 7,590,046 B1 | 9/2009 | Bhate et al. | |
| 7,688,742 B2 | 3/2010 | Sridhar et al. | |
| 2003/0112748 A1* | 6/2003 | Puppa et al. | 370/217 |
| 2003/0118019 A1* | 6/2003 | Mark et al. | 370/392 |

FOREIGN PATENT DOCUMENTS

WO WO 2009/098757 * 8/2009

* cited by examiner

*Primary Examiner* — Ronald Abelson
(74) *Attorney, Agent, or Firm* — Baker Botts L.L.P.

(57) ABSTRACT

In certain embodiments, monitoring a flow set to detect faults includes identifying, by a first maintenance end point, a flow set comprising flows that utilize a paths from the first maintenance end point through one or more intermediate nodes to a second maintenance end point. Continuity check messages are generated. Each continuity check message is formatted as a data packet that an intermediate node forwards. Each continuity check message comprises a header comprising a maintenance indicator. The continuity check messages are transmitted on the flows to allow the second maintenance end point to monitor the paths.

17 Claims, 1 Drawing Sheet

MONITORING A FLOW SET TO DETECT FAULTS

TECHNICAL FIELD

The present disclosure relates generally to telecommunications.

BACKGROUND

Multi-path forwarding computes multiple alternative paths between a source and a destination. The multiple paths might be overlapped, edge-disjointed, or node-disjointed with each other. Multi-path forwarding may provide fault tolerance, increased bandwidth, or improved security.

DESCRIPTION OF EXAMPLE EMBODIMENTS

Overview

In certain embodiments, monitoring a flow set to detect faults includes identifying, by a first maintenance end point, a flow set comprising flows that utilize paths from the first maintenance end point through one or more intermediate nodes to a second maintenance end point. Continuity check messages are generated. Each continuity check message is formatted as a data packet that an intermediate node forwards. Each continuity check message comprises a header comprising a maintenance indicator. The continuity check messages are transmitted on the flows to allow the second maintenance end point to monitor the paths.

DESCRIPTION

Figure 1:
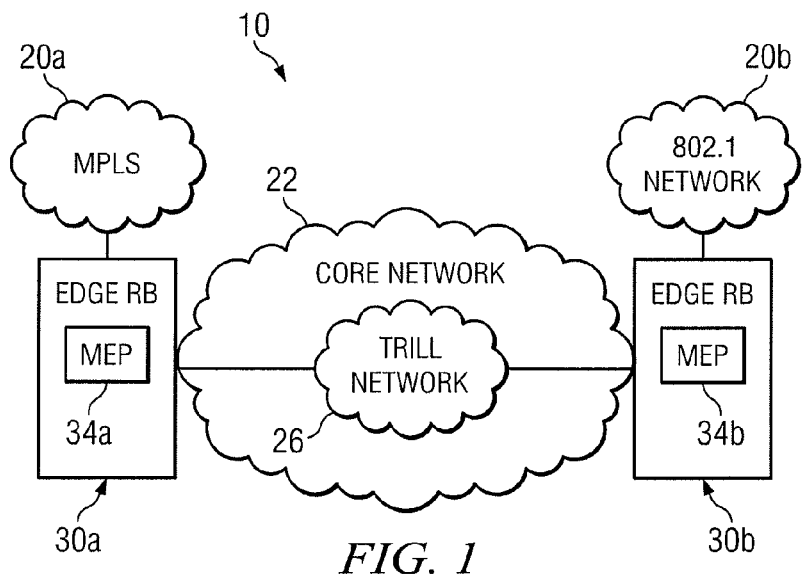
FIG. 1 illustrates an example of a system in which a flow set is monitored to detect faults.

FIG. 1 illustrates an example of a system 10 in which a flow set is monitored for faults. In the illustrated embodiment, system 10 includes one or more networks, such as area networks 20 (20a-b), a core network 22, and a Transparent Interconnection of Lots of Links (TRILL) network 26 coupled as shown. Area networks 20 include a MultiProtocol Label Switching (MPLS) network 20 and an IEEE 802.1 network 20b. Routing Bridges (RBridges or RBs) 30 (30a-b) may implement the TRILL protocol. An RBridge 30 may be an intermediate RBridge or an edge RBridge. An edge RBridge couples networks to core network 22 and may include a maintenance endpoint (MEP) 34 (34a-b).

In certain embodiments, a maintenance endpoint 34 identifies a flow set comprising flows that utilize paths originating from the maintenance end point 34. Maintenance endpoint 34 may generate continuity check messages represented as a data packet. A continuity check message may comprise a header that comprises a maintenance indicator. Maintenance endpoint 34 may transmit the continuity check messages on the flows to allow one or more other maintenance end points 34 to monitor the paths.

In certain embodiments, multiple paths may be set up between a pair of nodes. For example, multi-path forwarding may be used to set up multiple equal-cost unicast and/or multicast paths between node pairs. Multi-pathing may be used with Ethernet protocols such as TRILL and IEEE 802.1aq. In certain embodiments, system 10 may allow for monitoring of the paths between node pairs.

In certain embodiments, a communication network (20, 22, 24, 26) allows components to communicate with other components. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding. A communication network may include network elements. Examples of network elements include switches, gateways, bridges, load-balancers, firewalls, or any other suitable device, component, element, or apparatus operable to communicate in a network environment.

Area networks 20 may include LANs, MANs, and/or WANs. Core network 28 may provide paths for the exchange of information between different sub-networks. For example, core network 28 may include high capacity communication facilities that connect nodes to provide telecommunication services to customers of access networks. Core network 28 may route calls across a public switched telephone network (PSTN).

In certain embodiments, RBridges 30 are transparent to Layer 3 (L3) devices, and links interconnected by RBridges 30 appear to L3 devices to be a single link. In the embodiments, an ingress RBridge 30a receives a frame from an area network 20. The frame may have an inner Layer 2 header. Ingress RBridge 30a encapsulates the frame with a TRILL header that specifies egress RBridge 30b, where the frame is decapsulated. An outer Layer 2 (L2) header is also added to the frame. To forward the frame, a transit RBridge 30 replaces the outer L2 header at each hop with the L2 header for the next hop.

In certain embodiments, RBridges 30 may perform certain operations that may improve efficiency. For example, RBridges 30 may run a dynamic nickname acquisition protocol to save room in the TRILL header and simplify forwarding lookups. The dynamic nickname acquisition protocol may be used to select 2-octet nicknames for RBridges 30. A 2-octet nickname may be an abbreviation for the 6-octet IS-IS system ID and may be unique within the network.

In certain embodiments, RBridges 30 of TRILL network 26 run a link state protocol to broadcast links states among themselves such that each RBridge 30 knows about some or all other RBridges 30 and the connectivity among RBridges 30. In the embodiments, each RBridge 30 constructs a graph of network connectivity that shows which nodes are connected to which other nodes. Each RBridge 30 then independently calculates the next best logical path from it to each destination in the network and uses the collection of best paths as a routing table.

In certain embodiments, RBridges 30 may perform an equal-cost multi-path (ECMP) technique to route packets along multiple paths of equal cost. In the embodiments, an RBridge 30 identifies multiple paths by next-hop and decides which path (next-hop) to use according to a hash algorithm. In the embodiments, each next-hop is assigned a unique region in key space. The key space may be divided into equal regions such that there is equal usage among the next-hops, or the key space may be divided into unequal regions such that there is unequal usage among the next-hops. In certain examples, a homogenous hash algorithm may divide the key space into equal regions that cover some or all next-hops of the RBridge 30.

In the embodiments, when RBridge 30 receives a flow of packets, RBridge 30 examines the packet header fields that identify a flow, for example, the source and destination fields of the packet. RBridge 30 performs a hash (for example, CRC16) over the packet header fields to determine a key and selects the next-hop assigned to the key space of the key.

In the embodiments, an RBridge 30 can determine paths (such as unicast paths) originating from the RBridge 30 to every other RBridge 30. The paths may include one, more than one, or all equal cost multi-paths (ECMPs). In the embodiments, an RBridge 30 can also determine one, more than one, or all multicast trees of core network 22. An RBridge 30 may also advertise the number of flows it has and/or will initiate along the paths. In certain embodiments, TRILL network 26 may be, for example, an Internet Engineering Task Force (IETF) TRILL network that runs Intermediate System to Intermediate System (IS-IS) routing protocol.

In certain embodiments, RBridge 30 may instantiate an MEP 34 for one or more VLANS for which RBridge 30 is elected to be an assigned forwarder. For example, RBridge 30 may determine that it is an appointed forwarder for a VLAN on a given segment and may then automatically create an MEP 34 for the VLAN. The MEP 34 may face away from a segment and towards TRILL network 26. An MEP 34 created by an RBridge 30 may be regarded as the MEP corresponding to the RBridge. An MEP 34 may have any suitable identifier. For example, the RBridge nickname for the RBridge corresponding to the MEP 34 may be used as the MEP identifier.

MEP 34 may manage and construct flows at RBridge 30. In certain embodiments, a flow may be defined according to one or more parameters. Examples of parameters include a destination RBridge nickname, a destination MAC address (such as the TRILL inner MAC DA), a source MAC address (TRILL inner MAC SA), VLAN identifier, and/or other parameter. A flow may have any suitable flow identifier. For example, a flow identifier may be a local numeric identifier significant only for the originating MEP 34.

MEP 34 may identify a set of flows that may be used to exercise one, some, or all paths originating from the RBridge 30 of the MEP 34 and then send a continuity check message along each flow in order to allow a receiving MEP 34 to monitor the paths. The paths may be monitored on a per virtual local area network (VLAN) basis. The set of flows that exercise all paths may be referred to as a full coverage flow set.

MEP 34 may identify the full coverage flow set in any suitable manner. As an example, TRILL network 26 may employ a homogeneous hashing algorithm for multi-path path selection, such as an ECMP hashing algorithm. MEP 34 knows the multi-path information of the network and the flow parameters to use to exercise each path. MEP 34 may derive the full coverage flow set from the knowledge of the paths and the hashing algorithm. For example, MEP 34 may derive keys from the sources and destinations of the paths and then determine next-hops assigned to the keys. The next-hops may be used as the full coverage flow set.

As another example, MEP 34 may discover the full coverage flow set using a path finding technique (such as trace or discovery technique) operating at the Ethernet layer. In certain cases, TRILL traceroute may be performed. In the example, edge RBridge 30a sends a traceroute message to its peers asking them to respond with information about their paths and flow parameters to use to exercise the paths. MEP 34a constructs the flows using parameters supplied in the response. In certain other cases, RBridge 30a receives discovery messages multicast from its peers. The messages may include information about the paths and flow parameters. MEP 34a constructs the flows using the parameters. As yet another example, MEP 34 may be configured with the full coverage flow set information.

In certain embodiments, an MEP 34 may periodically transmit a continuity check message. Any suitable continuity check message may be used, for example, a TRILL continuity check message. The continuity check message may be transmitted for each flow of the full coverage flow set. The MEP 34 may transmit the continuity check message according to any suitable scheduling scheme. Examples of scheduling schemes include a round-robin scheduling scheme, a random scheduling scheme, or other scheduling scheme.

In certain embodiments, a scheduling scheme may designate that continuity check messages are sent at a higher rate for certain flows than for other flows. For example, continuity check messages may be sent at a higher rate for critical flows than for non-critical flows. As another example, continuity check messages may be sent at a higher rate for higher priority flows than for lower priority flows. As another example, continuity check messages may be sent at a higher rate for voice flows than for data flows or vice-versa.

An MEP 34 that receives continuity check messages may monitor paths using the continuity check messages. In certain embodiments, if MEP 34 receives a continuity check message on a path, MEP 34 may conclude that the path from the ingress RBridge 30 to the egress RBridge 30 is operational. In certain embodiments, the receiving MEP 34 may build a continuity check database to track flows initiated by a peer MEP 34.

In certain embodiments, MEP 34 may discover the number of flows to be expected from an RBridge 30 from advertisements sent by the RBridge 30. Given the number of flows to expect, MEP 34 may detect flow problems. For example, a missing flow may indicate a path that never came up. As another example, an unexpected flow may indicate a connectivity error. As another example, a lost flow may indicate that a path was operational then failed.

A receiving MEP 34 may keep a timer for each flow. The timer may be set to an interval that is a constant multiplier N of the transmission interval of the continuity check messages for the flow. N may be any suitable number, for example, 1, 2, 3, or 4 or more. An MEP 34 may declare a loss of continuity for a path if N consecutive continuity check messages have not been received from a peer MEP.

In certain embodiments, an MEP 34 may construct test flows to distribute continuity check messages over test flows. The test flows may be constructed in any suitable manner. For example, customer test MACs may be used. The MAC destination address and MAC source address may be diversified to provide the multi-path coverage. Any suitable test IP addresses may be used, for example, the 127.0.0.0/8 IP address range may be used. The source and/or destination Layer 4 port identifiers may be wild cards.

Figure 2:
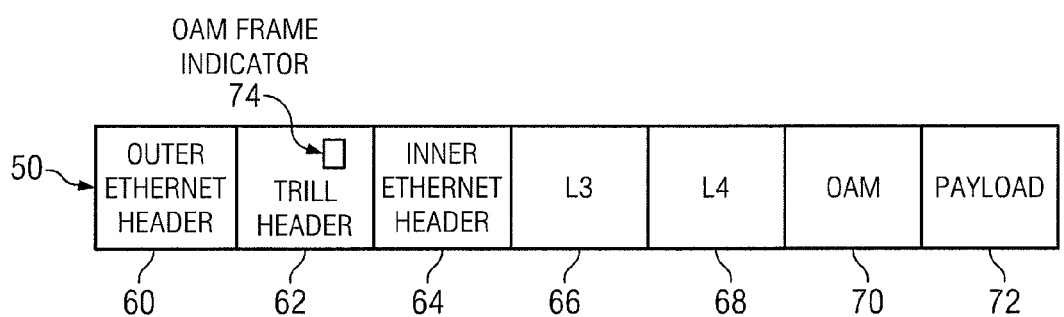
FIG. 2 illustrates an example of a continuity check message.

FIG. 2 illustrates an example of a continuity check message 50. In certain embodiments, continuity check message 50 may be formatted such that a device that receives message 50 treats message 50 like a data traffic packet instead of a maintenance packet. In certain embodiments, the frame header may be formulated to look like the frame header of a data packet such that edge RBridges 30 process message 50, while intermediate nodes (such as transit RBridges) treat message 50 as a regular data packet and forward message 50.

In the illustrated example, message 50 includes an outer Ethernet header 60, a TRILL header 62, an inner Ethernet header 64, Layer 3 field 66, a Layer 4 field 68, an OAM field 70, and a payload 72. Outer and inner Ethernet header 60 and 64 may include Ethernet information. In certain embodiments, outer Ethernet header 60 may be formulated to look like a data packet.

TRILL header 62 comprises 6 octets. The first 2 octets compromise a 6-bit decrementing hop count plus flags, the next 2 octets comprise an egress RBridge nickname, and the final 2 octets comprise an ingress RBridge nickname. For multidestination frames, the egress RBridge nickname specifies a distribution tree for the frame, where the named RBridge is the root of the distribution tree. The ingress RBridge selects which distribution tree the frame should travel along.

In certain embodiments, TRILL header 62 may include a maintenance indicator that indicates that message 50 is a maintenance frame. For example, the maintenance indicator may be OAM frame indicator 74 that indicates that message 50 is an OAM frame. OAM frame indicator 74 may be a bit set to 1 to indicate that message 50 is an OAM frame. Only edge RBridges 30 look at OAM frame indicator 74 to determine that message 52 is an OAM message.

Layer 3 field 66 may include Internet Protocol (IP) information. Layer 4 field 68 may include UDP/TCP information. OAM field 70 may include OAM information such as a defect indication or defect notification.

A continuity check message may include any suitable attributes, for example, a flow identifier, a service identifier, and/or any other suitable attribute. A service identifier may be an identifier that is agreed upon between some or all MEPs 34 of a VLAN. A continuity check message may be sent to a multicast destination address and tagged with a VLAN corresponding to the service being monitored.

Figure 3:
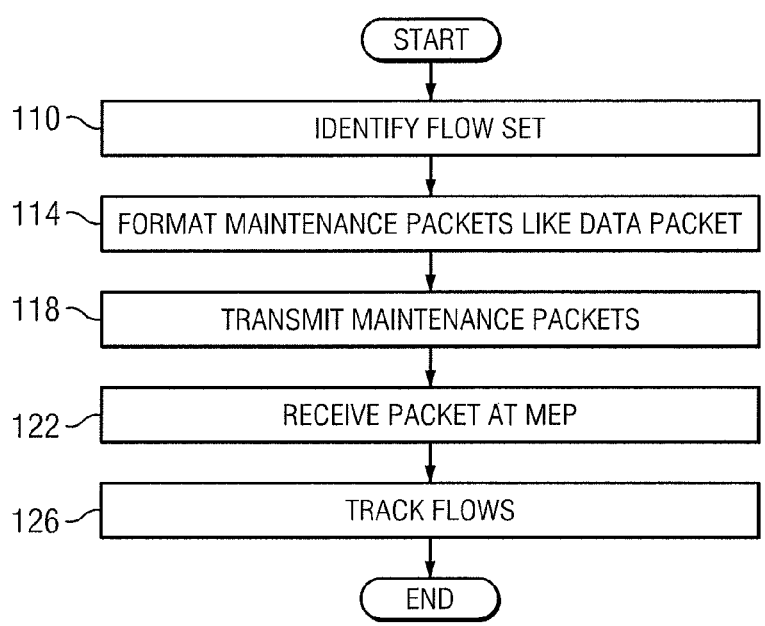
FIG. 3 illustrates an example of a method for monitoring a flow set to detect faults.

FIG. 3 illustrates an example of a method for monitoring a flow set to detect faults. The method starts at step 110, where MEP 34a of ingress RBridge 30a identifies a flow set from ingress RBridge 30a to egress RBridge 30b. MEP 30a may identify the flow set in any suitable manner, as discussed herein. The set of flows may be a full coverage flow set that exercises all paths originating from the RBridge 30 of the MEP 34.

MEP 34a formats maintenance packets to look like data packets at step 114. For example, the maintenance packets may be formatted as message 50. Edge RBridge 30a transmits maintenance packets at step 118. The maintenance packets may be transmitted according to a scheduling scheme, such as a round robin or random scheduling scheme.

Egress RBridge 30b receives the maintenance packets at step 122. RBridge 30b may use the packets to determine whether paths from the ingress RBridge 30a to the egress RBridge 30b are operational. MEP 34b of RBridge 30b tracks the flows at step 126. MEP 34b may discover the number of flows to be expected from RBridge 30a from advertisements sent by RBridge 30a. Given the number of flows to expect, MEP 34b may detect missing, unexpected, or lost flows. In certain embodiments, MEP 34b may build a continuity check database to track flows initiated by RBridge 30a. The method then ends.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of RBridge 30 and MEP 34 may be performed by one component, or the operations of MEP 34 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   identifying, by a first maintenance end point, a flow set comprising a plurality of flows that utilize a plurality of paths from the first maintenance end point through one or more intermediate nodes to a second maintenance end point;

generating a plurality of continuity check messages, each continuity check message formatted as a data packet that an intermediate node treats like a data packet instead of a maintenance packet, each continuity check message comprising a Transparent Interconnection of Lots of Links (TRILL) header comprising a maintenance indicator; and transmitting the continuity check messages on the flows to allow the second maintenance end point to monitor the paths, the one or more second maintenance end points comprising one or more receiving endpoints configured to determine an expected number of the plurality of flows utilizing the plurality of paths and to detect a flow problem based on the expected number of the plurality of flows to be received on the plurality of paths and the continuity check messages received.

2. The method of claim 1, the header comprising an inner Ethernet header disposed after the TRILL header and an outer Ethernet header disposed before the TRILL header.

3. The method of claim 1, the identifying a flow set further comprising:
determining the flows from a hashing algorithm and the paths.

4. The method of claim 1, the identifying a flow set further comprising:
performing a path finding technique operating at the Ethernet layer to yield the flows.

5. The method of claim 1, the identifying a flow set further comprising:
determining the flows from information configured at the first maintenance end point.

6. The method of claim 1, the transmitting the continuity check messages further comprising:
transmitting the continuity check messages according to a round robin scheduling scheme.

7. The method of claim 1, the transmitting the continuity check messages further comprising:
transmitting a first subset of the continuity check messages at a first rate along a first subset of the flows; and
transmitting a second subset of the continuity check messages at a second rate along a second subset of the flows, the first rate higher than the second rate, the first subset of flows more critical than the second subset of flows.

8. An apparatus comprising:
one or more non-transitory computer readable media configured to store computer executable instructions; and
one or more processors of a first maintenance end point, the processors configured, when executing the instructions, to:
identify a flow set comprising a plurality of flows that utilize a plurality of paths from the first maintenance end point through one or more intermediate nodes to a second maintenance end point;
generate a plurality of continuity check messages, each continuity check message formatted as a data packet that an intermediate node treats like a data packet instead of a maintenance packet, each continuity check message comprising a Transparent Interconnection of Lots of Links (TRILL) header comprising a maintenance indicator; and
transmit the continuity check messages on the flows to allow the second maintenance end point to monitor the paths, the one or more second maintenance end points comprising one or more receiving endpoints configured to determine an expected number of the plurality of flows utilizing the plurality of paths and to detect a flow problem based on the expected number of the plurality of flows to be received on the plurality of paths and the continuity check messages received.

9. The apparatus of claim 8, the header comprising an inner Ethernet header disposed after the TRILL header and an outer Ethernet header disposed before the TRILL header.

10. The apparatus of claim 8, the identifying a flow set further comprising:
determining the flows from a hashing algorithm and the paths.

11. The apparatus of claim 8, the identifying a flow set further comprising:
performing a path finding technique operating at the Ethernet layer to yield the flows.

12. The apparatus of claim 8, the identifying a flow set further comprising:
determining the flows from information configured at the first maintenance end point.

13. The apparatus of claim 8, the transmitting the continuity check messages further comprising:
transmitting the continuity check messages according to a round robin scheduling scheme.

14. The apparatus of claim 8, the transmitting the continuity check messages further comprising:
transmitting a first subset of the continuity check messages at a first rate along a first subset of the flows; and
transmitting a second subset of the continuity check messages at a second rate along a second subset of the flows, the first rate higher than the second rate, the first subset of flows more critical than the second subset of flows.

15. One or more non-transitory computer readable media configured to store computer executable instructions that, when executed by one or more processors, are configured to:
identify a flow set comprising a plurality of flows that utilize a plurality of paths from the first maintenance end point through one or more intermediate nodes to a second maintenance end point;
generate a plurality of continuity check messages, each continuity check message formatted as a data packet that an intermediate node treats like a data packet instead of a maintenance packet, each continuity check message comprising a Transparent Interconnection of Lots of Links (TRILL) header comprising a maintenance indicator; and
transmit the continuity check messages on the flows to allow the second maintenance end point to monitor the paths, the one or more second maintenance end points comprising one or more receiving endpoints configured to determine an expected number of the plurality of flows utilizing the plurality of paths and to detect a flow problem based on the expected number of the plurality of flows to be received on the plurality of paths and the continuity check messages received.

16. The media of claim 15, the header comprising an inner Ethernet header disposed after the TRILL header and an outer Ethernet header disposed before the TRILL header.

17. The media of claim 15, the transmitting the continuity check messages further comprising:
transmitting the continuity check messages according to a round robin scheduling scheme.

* * * * *